US012515487B1

(12) United States Patent
Cerri, III

(10) Patent No.: US 12,515,487 B1
(45) Date of Patent: Jan. 6, 2026

(54) SIDE LOADING TOP MOUNT

(71) Applicant: The Pullman Company LLC, Northville, MI (US)

(72) Inventor: Joseph F. Cerri, III, Norwalk, OH (US)

(73) Assignee: The Pullman Company LLC, Northville, MI (US)

( * ) Notice: Subject to any disclaimer, the term of this patent is extended or adjusted under 35 U.S.C. 154(b) by 0 days.

(21) Appl. No.: 18/823,951

(22) Filed: Sep. 4, 2024

(51) Int. Cl.
*B60G 13/00* (2006.01)

(52) U.S. Cl.
CPC ...... *B60G 13/003* (2013.01); *B60G 2204/128* (2013.01); *B60G 2204/41* (2013.01)

(58) Field of Classification Search
CPC ............ B60G 13/003; B60G 2204/128; B60G 2204/41; B60G 15/068; F16F 1/12
See application file for complete search history.

(56) References Cited

U.S. PATENT DOCUMENTS

| | | | | |
|---|---|---|---|---|
| 3,043,581 A * | 7/1962 | Schmidt | ............... | B60G 15/063 267/221 |
| 4,478,396 A * | 10/1984 | Kawaura | ............... | B60G 15/068 267/141.1 |
| 5,009,401 A * | 4/1991 | Weitzenhof | ............... | F16F 9/05 280/124.157 |
| 5,263,692 A * | 11/1993 | Ito | ............... | F16F 13/24 267/140.13 |
| 6,182,953 B1 * | 2/2001 | Smith | ............... | B60G 15/063 267/33 |
| 6,290,218 B1 * | 9/2001 | Mayerbock | ............... | B60G 15/067 280/124.147 |
| 6,394,436 B1 * | 5/2002 | Schnaars | ............... | B60G 13/003 280/124.147 |
| 6,843,352 B2 * | 1/2005 | Jacoby | ............... | F16F 3/093 267/209 |
| 7,108,253 B2 * | 9/2006 | Venton-Walters | ... | B60G 13/003 267/140 |
| 7,182,189 B2 * | 2/2007 | Schutz | ............... | B60G 15/067 188/321.11 |
| 7,464,919 B2 * | 12/2008 | Hermann | ............... | B60G 15/068 267/293 |
| 7,607,668 B2 * | 10/2009 | Dugandzic | ............... | B60G 15/068 280/86.752 |
| 7,806,392 B2 * | 10/2010 | Ishikawa | ............... | B60G 15/068 267/221 |
| 7,896,321 B2 | 3/2011 | Nakashima et al. | | |

(Continued)

FOREIGN PATENT DOCUMENTS

| | | | | |
|---|---|---|---|---|
| CN | 217873934 U | 11/2022 | | |
| DE | 19928599 C1 * | 2/2001 | ............ | B60G 13/003 |

(Continued)

*Primary Examiner* — Timothy Wilhelm
(74) *Attorney, Agent, or Firm* — Harness, Dickey & Pierce, P.L.C.

(57) ABSTRACT

A damper mount comprises an isolator including an elastomeric body surrounding an inner core. The isolator extends along a longitudinal axis. A housing includes a main body and a removable segment. The main body and the removable segment define a pocket in receipt of the elastomeric body. The removable segment is radially translatable relative to and restricted from moving along the longitudinal axis.

19 Claims, 6 Drawing Sheets

(56) References Cited

U.S. PATENT DOCUMENTS

| | | | |
|---|---|---|---|
| 7,938,418 B1* | 5/2011 | Coombs | B60G 15/068 |
| | | | 280/124.147 |
| 9,193,241 B2* | 11/2015 | Suchta | B60G 15/067 |
| 9,315,085 B1* | 4/2016 | Riley | B62D 65/12 |
| 10,570,976 B1* | 2/2020 | Evans | F16F 1/13 |
| 11,603,901 B2* | 3/2023 | Zegveld | F16F 9/54 |
| 11,938,777 B1* | 3/2024 | Wong | B60G 17/0272 |
| 2008/0303233 A1* | 12/2008 | Dugandzic | B62D 17/00 |
| | | | 280/86.751 |
| 2020/0062065 A1* | 2/2020 | Kirar | F16F 9/0454 |
| 2020/0063821 A1* | 2/2020 | Ramm | F16F 9/30 |

FOREIGN PATENT DOCUMENTS

| | | | | |
|---|---|---|---|---|
| DE | 19928599 C5 | 1/2007 | | |
| DE | 102012202310 A1 * | 8/2013 | | B60G 15/068 |
| KR | 102015014 B1 | 8/2019 | | |

* cited by examiner

SIDE LOADING TOP MOUNT

FIELD

Top mount assemblies are used to couple dampers, such as shock absorbers and struts, to motor vehicles. A top mount assembly including a housing with a radially removable segment is discussed.

BACKGROUND

The statements in this section merely provide background information related to the present disclosure and may not constitute prior art.

Known top mount assemblies typically include an outer metal cap fixed to a body of a vehicle. The mount assembly often includes a central inner component that is at least partially encapsulated with an elastomeric or plastic material. A piston rod of the damper is fixed to the inner component. The inner component and the elastomeric material are positioned within and at least partially covered by the cap. The components require an axial assembly process with all parts being assembled parallel to the piston rod.

Typical top mount assemblies include open tops that tend to undesirably collect debris. Servicing the top mount assemblies may be cumbersome and time consuming due to the contamination. A need exists for an alternate top mount configuration and damper assembly method.

SUMMARY

A damper mount comprises an isolator including an elastomeric body surrounding an inner core. The isolator extends along a longitudinal axis. A housing includes a main body and a removable segment. The main body and the removable segment define a pocket in receipt of the elastomeric body. The removable segment is radially translatable relative to and restricted from moving along the longitudinal axis.

In another arrangement, a damper mount comprises an isolator including an elastomeric body and having a longitudinal axis. The damper mount also includes a housing having a main body and a removable segment. The main body includes an end wall. Each of the main body and the removable segment include portions of a side wall and portions of an intermediate wall. The end wall, the side wall, and the intermediate wall define a pocket in receipt of the elastomeric body. The removable segment is radially translatable relative to the longitudinal axis.

BRIEF DESCRIPTION OF DRAWINGS

The drawings described herein are for illustration purposes only and are not intended to limit the scope of the present disclosure in any way.

DESCRIPTION

Figure 1:
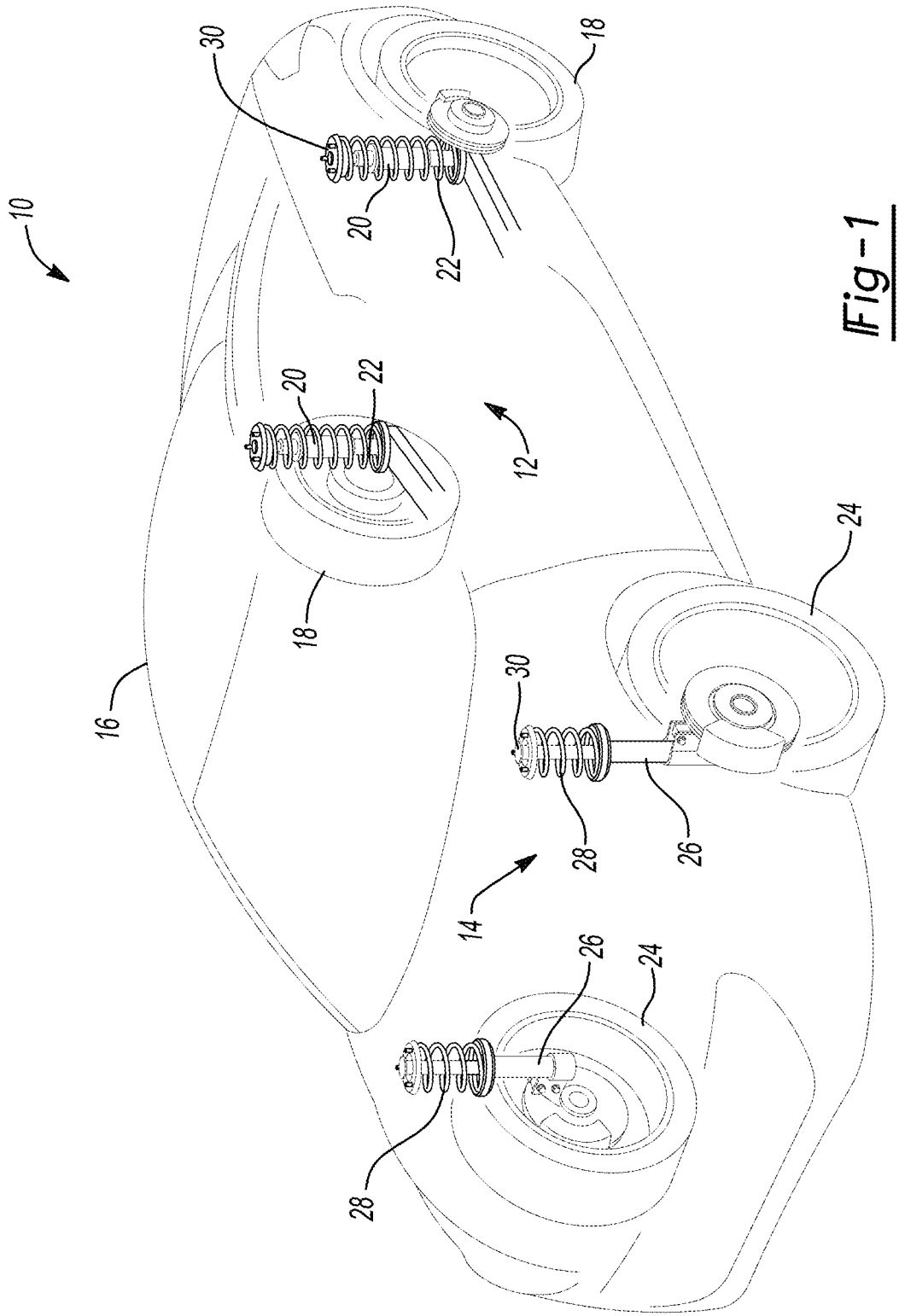
FIG. 1 depicts an exemplary vehicle equipped with a top mount assembly constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

FIG. 1 depicts an exemplary vehicle 10 incorporating a suspension system including top mount assemblies in accordance with the teachings of present disclosure. A top mount assembly may more generally be identified as a suspension mount. Vehicle 10 includes a rear suspension 12, a front suspension 14 and a body 16. Rear suspension 12 is adapted to operatively support the vehicle's rear wheels 18. Rear suspension 12 is operatively connected to body 16 by means of a pair of dampers 20 and a pair of helical coil springs 22. Front suspension 14 operatively supports the vehicle's front wheels 24. Front suspension 14 is operatively connected to body 16 by means of a second pair of dampers 26 and by a pair of helical coil springs 28. Dampers 20 and 26 serve to dampen the relative motion of the unsprung portion (i.e. front and rear suspensions 12 and 14, respectively) and the sprung portion (i.e. body 16) of vehicle 10. The term "damper" as used herein is intended to include at least shock absorbers and struts. The spring and shock arrangements relating to dampers 20 and springs 22 may be separate spaced apart components or coil-over arrangements in an independent rear suspension, as shown.

Referring now to FIGS. 2-6, a suspension mount or top mount assembly 30 for a damper is depicted in accordance with an embodiment of the present disclosure. Top mount assembly 30 generally includes an elastomeric isolator 32 disposed within a housing 34.

Figure 5:
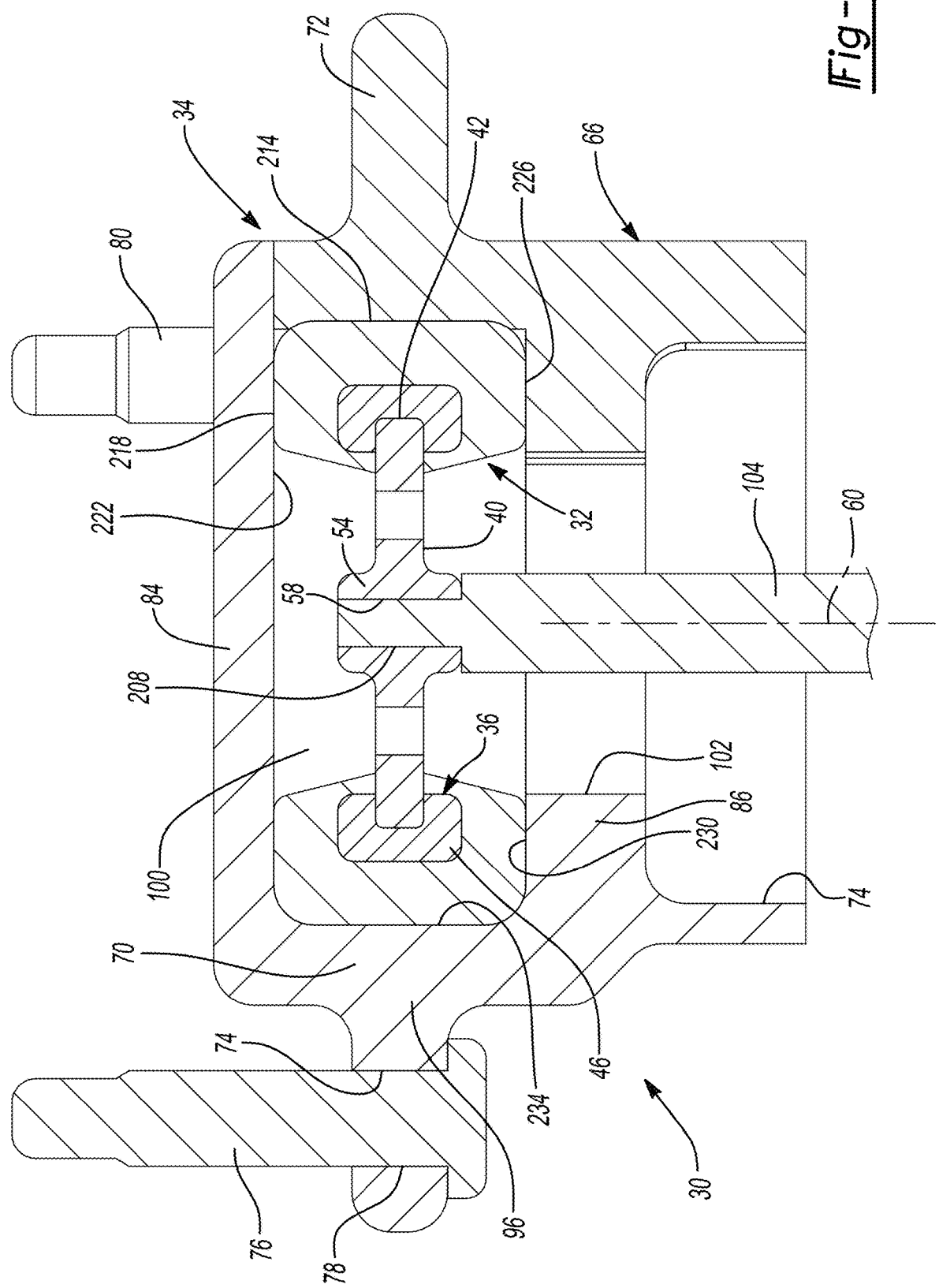
FIG. 5 is a cross-sectional view of the piston rod coupled to the top mount assembly.

As best shown in FIG. 5, elastomeric isolator 32 includes an inner core 36 and an elastomeric body 38 encapsulating inner core 36. Inner core 36 includes a plate 40 having a peripheral edge 42 encapsulated by a plastic ring 46. Plate 40 may be constructed from low carbon steel or aluminum. Plate 40 includes an inner portion 50 having a substantially flat disk shape with a centralized boss 54 having an aperture 58 extending therethrough. Aperture 58 extends along a central longitudinal axis 60 of top mount assembly 30. Elastomeric body 38 may be shaped as a right circular cylinder having an outer diameter $D_1$ and a height $H_1$. In the embodiment depicted in the figures, plastic ring 46 is entirely embedded within elastomeric body 38.

Housing 34 is formed from two separable components including a main body 66 and a removable segment 68. When assembled together, the main body 66 and removable segment 68 form a hollow cylindrically shaped portion 70 formed with a flange 72. Flange 72 radially outwardly extends from cylindrically shaped portion 70 and includes a plurality of apertures 74 extending therethrough. Fasteners 76 extend through apertures 74 and may be fixed to flange 72 via splines 78. Shanks 80 of fasteners 76 may be externally threaded for engagement with nuts, not shown, when coupling top mount assembly 30 to vehicle 10.

Cylindrically shaped portion 70 includes an end wall 84 that is present on main body 66 but not removeable segment 68. An intermediate wall 86 extends substantially parallel to end wall 84. End wall 84 and intermediate wall 86 extend at right angles to longitudinal axis 60. Cylindrically shaped portion 70 further includes a circumferentially extending side wall 96 that, in cooperation with end wall 84 and intermediate wall 86, defines an isolator pocket 100. An aperture 102 extends through intermediate wall 86 to allow receipt of an exemplary piston rod 104 of a damper. Side wall 96 and intermediate wall 86 define a recess 106 positioned on an opposite side of intermediate wall 86 as isolator pocket 100.

It should be appreciated that side wall 96 does not extend contiguously 360 degrees about axis 60. On the contrary, main body 66 includes a first side wall portion 97 and removable segment 68 includes a second side wall portion 98 that are aligned with one another. Main body 66 includes a radially inwardly extending aperture 108 to provide a side loading feature that will be described in greater detail below. Aperture 108 is in receipt of removable segment 68 when in the assembled position.

Aperture 108 is at least partially defined as a radially inwardly extending slot 110 bounded by a first face 114 and a second face 118 formed on a first intermediate wall portion 120 and a first skirt portion 122. In this area of main body 66, slot 110 has a first width $W_1$. Slot 110 includes a second width $W_2$ at flange 72 and the remainder first side wall portion 97. The width $W_2$ of slot 110 is defined by a third face 126 and an opposing fourth face 130. Slot 110 radially inwardly extends through the entirety of first side wall portion 97 such that the slot is in open communication with isolator pocket 100, aperture 102, and recess 106.

Main body 66 includes features to maintain proper alignment of removable segment 68 with main body 66. In particular, third face 126 includes a first groove 136 radially extending within isolator pocket 100. A second groove 140 is formed on fourth face 130 and extends substantially parallel to first groove 136 within isolator pocket 100. Third face 126 is spaced apart from fourth face 130 a distance substantially equal to or slightly smaller than diameter $D_1$ of elastomeric body 38. A distance between end wall 84 and intermediate wall 86 is substantially the same as or slightly smaller than height $H_1$ of elastomeric body 38.

Removable segment 68 includes several features in addition to second side wall portion 98 that complement geometrical features of main body 66. For example, flange 72 includes a first flange portion 144 on main body 66 and a second flange portion 148 on removable segment 68. A second intermediate wall portion 152 is sized and shaped to complement first intermediate wall portion 120 when removable segment 68 is at the assembled position. Second intermediate wall portion 152 includes fifth face 156 in an opposite sixth face 160 defining the circumferential extent of second intermediate wall portion 152. A width capital $W_3$ is slightly less than width W to allow a slip fit between second intermediate wall portion 152 and first intermediate wall portion 120. A radial inward extent of second intermediate wall portion 152 is defined by a curved surface 164 that is positioned in alignment with a curved surface 167 of first intermediate wall portion 120 at aperture 102.

Removable segment 68 also includes a second skirt portion 168 that fits within slot 110 to complement first skirt portion 122. Second skirt portion 168 also includes width $W_3$.

Second side wall portion 98 includes a seventh face 172 and an eighth face 176 positioned at its opposite extent. A distance between seventh face 172 and eighth face 176 defines a width $W_4$. Width $W_4$ is slightly less than width $W_2$ of slot 110 to allow a slip fit interconnection between removable segment 68 and main body 66. A first rail 180 radially extends along and protrudes from seventh face 172 a second rail 184 extends along and protrudes from eighth face 176. First rail 180 extends substantially parallel to second rail 184. First rail 180 and second rail 184 are sized and shaped for receipt within first groove 136 and second groove 140, respectively. The rail and groove combination acts a guide to assure proper alignment of removable segment 68 to main body 66.

Removable segment 68 is equipped with a retainer 188 configured to removably couple removable segment 68 to main body 66. Retainer 188 includes a first leg 192 and a second leg 196. First leg 192 and second leg 196 are shaped as curved bars emanating from a central portion of removable segment 68 such as at the position of second intermediate wall portion 152. First leg 192 includes a distal end face 200. Second leg 196 includes a distal end face 204. A spacing between first leg 192 and second leg 196 is depicted as a distance Li being slightly less than an outer diameter of first the skirt portion 122. At least one of first leg 192 and second leg 196 are formed from a material that is elastically deformable such as steel, aluminum, spring steel, composites, or the like. Based on distance Li being slightly less than the outer diameter of first skirt portion 122, retainer 188 is engageable with main body 66 in a snap fit connection. As removable segment 68 is radially translated from a distant position toward the assembled position, first leg 192 and second leg 196 separate from one another when the legs 192, 196 engage first skirt portion 122. As radial translation of removable segment 68 toward the assembled position continues, first leg 192 and second leg 196 return, at least slightly, toward their undeformed position once the first and second distal end faces 200, 204 pass by the maximum diameter of first skirt portion 122.

In at least one embodiment, it is envisioned that removable segment 68 is constructed as a monolithic, one-piece component including each of the geometrical features previously described. Removable segment 68 may be constructed from aluminum or plastic. It should be appreciated that retainer 188 may alternatively be positioned on main body 66 instead of being part of removable segment 68 as depicted in the figures.

The geometrical features of top of mount assembly 30 allow an assembler of dampers and vehicles to vary the order of operations performed to connect a damper to top mount assembly 30 or possibly vary the order of operations performed when installing the damper and top mount to a vehicle. For example, an assembler may find it desirable to attach elastomeric isolator 32 to piston rod 62 as one of the first assembly steps. This may be accomplished in any number of ways, including inserting a reduced diameter portion 208 of piston rod 104 within aperture 58 of plate 40. A threaded interconnection may exist. Alternatively, a portion of piston rod 104 may extend through plate 40 and a nut (not shown) may be threadedly engaged with piston rod 104 to fix elastomeric isolator 32 thereto.

In the next contemplated step of assembly, the subassembly of piston rod 104 and elastomeric isolator 32 may be coupled to top mount assembly 30 with removable segment 68 positioned at an offset location, not in the assembled position. Elastomeric isolator 32 is radially translated through slot 110 to enter isolator pocket 100. During the translation, an outer cylindrical surface 214 of elastomeric body 38 passes across third face 126 and fourth face 130. Optionally, elastomeric body 38 may be compressed at this time. Concurrently, a first planar surface 218 of elastomeric body 38 is positioned adjacent to or an biased engagement with a surface 222 of end wall 84. In similar fashion, an opposite planar surface 226 of elastomeric body 38 is positioned adjacent to or in biased engagement with a surface 230 of intermediate wall 86. Piston rod 104 is also radially translated through slot 100. Radial translation of elastomeric isolator 32 and damper rod 104 continues until outer cylindrical surface 214 of elastomeric body 38 is moved into contact with a curved inner surface 234 of side wall 96. Piston rod 104 is now positioned within aperture 102.

Figure 2:
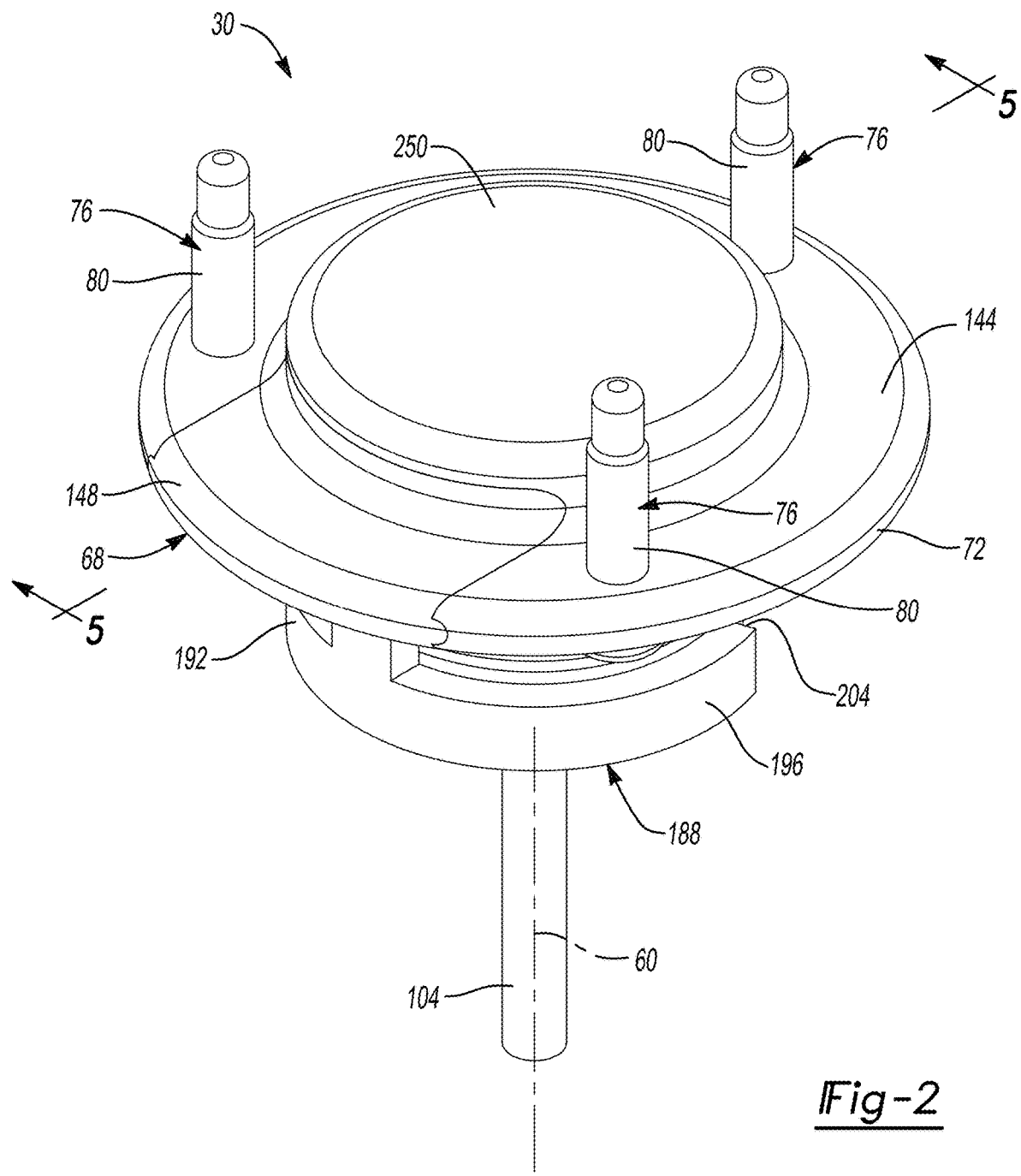
FIG. 2 is a perspective view of a top mount assembly coupled to a damper piston rod.
Figure 3:
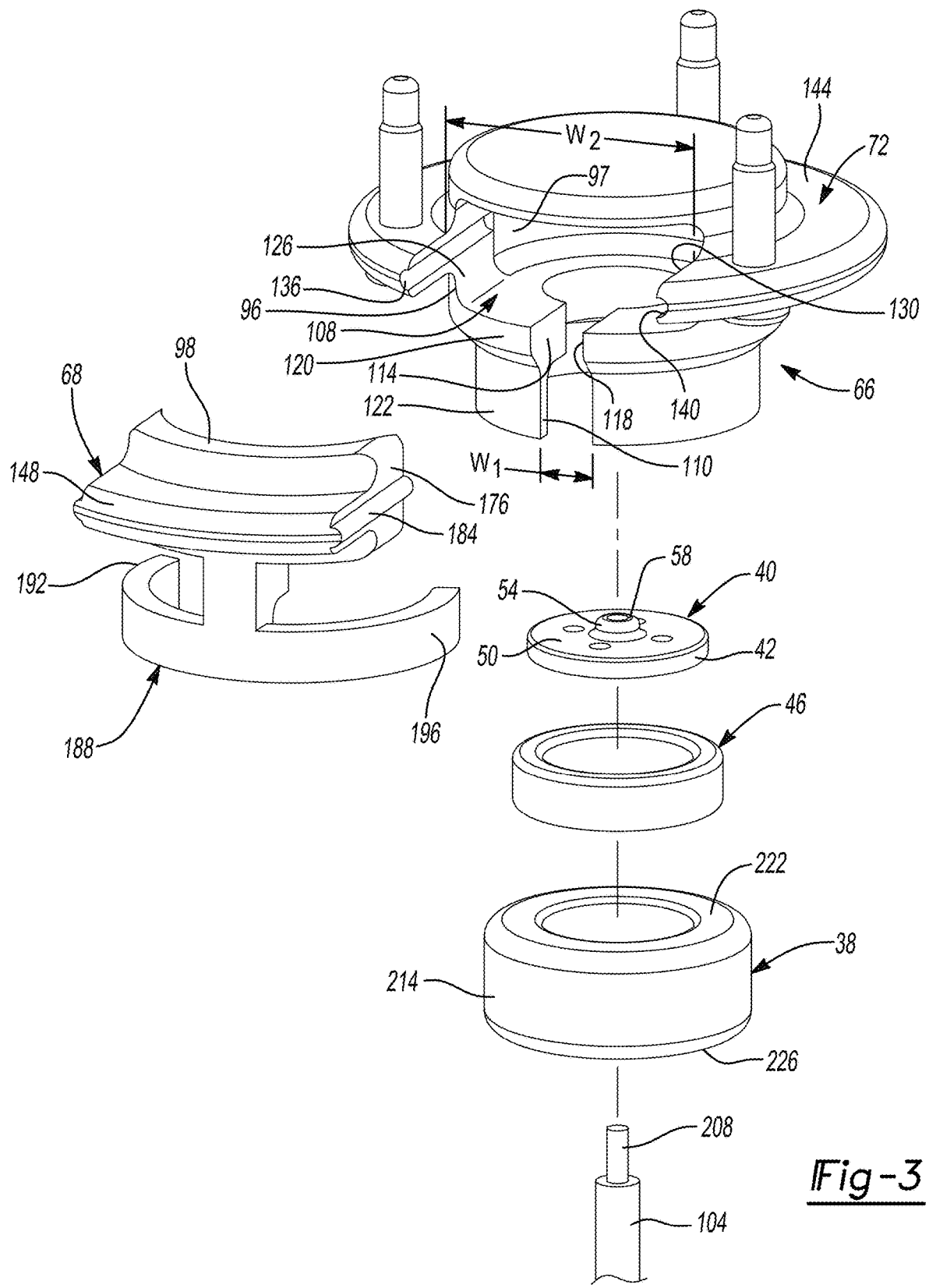
FIG. 3 is an exploded perspective view of the top mount assembly and piston rod shown in FIG. 2.
Figure 4:
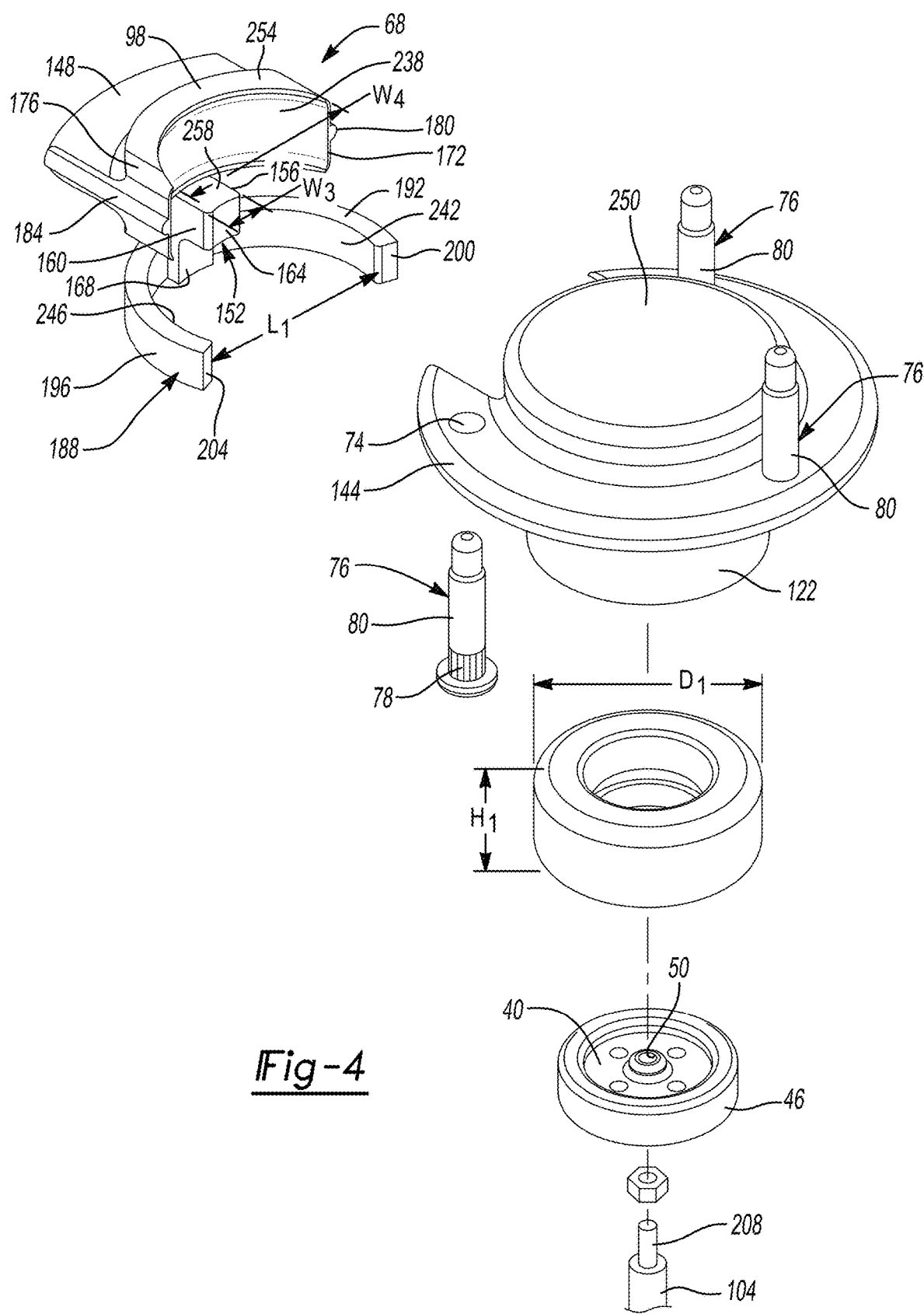
FIG. 4 is another exploded perspective view of the top mount assembly and piston rod.
Figure 6:
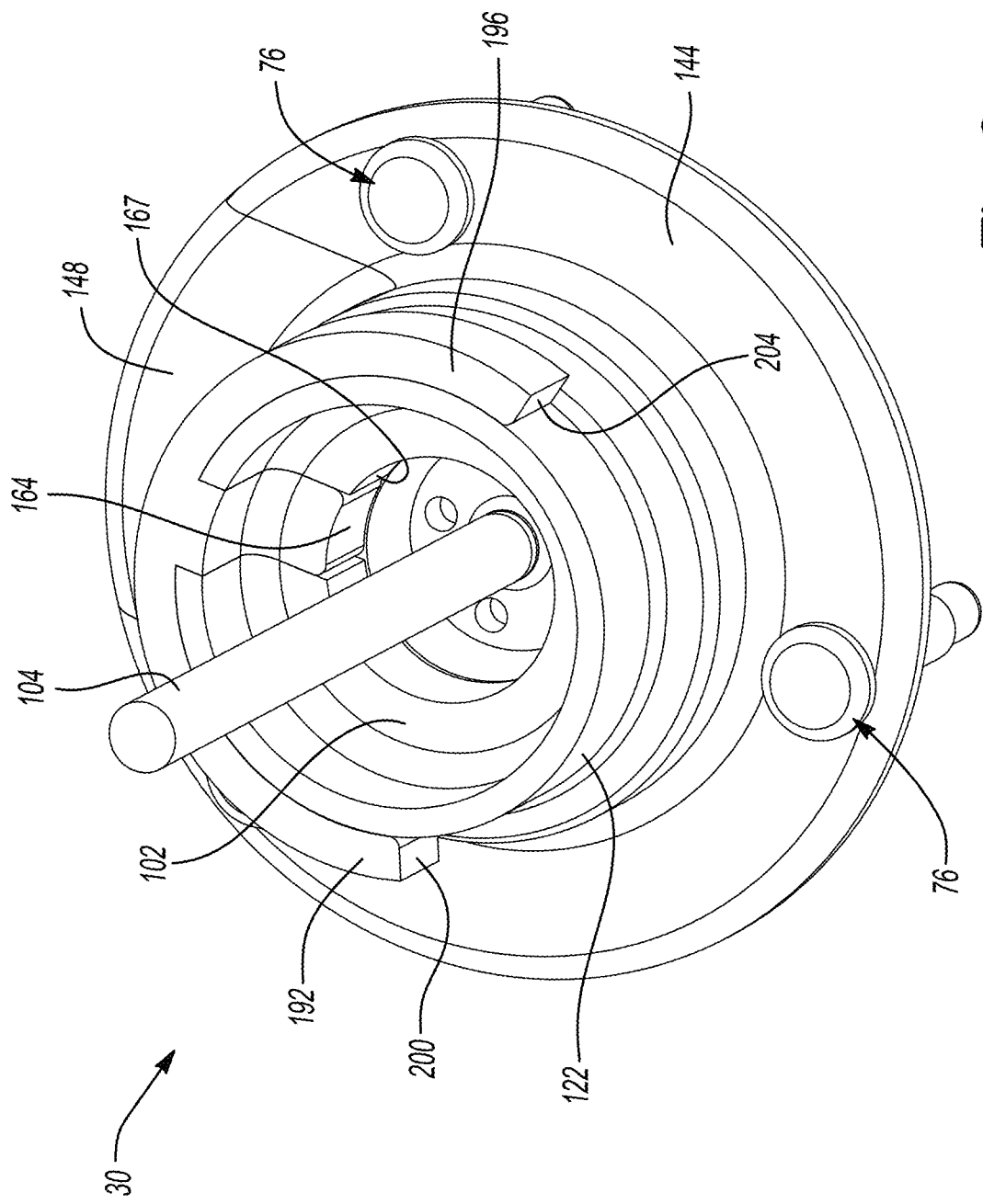
FIG. 6 is another perspective view of the top mount assembly and piston rod.

Removable segment 68 may now be oriented to align first rail 84 with first groove 136 align second rail 184 with second groove 140. Removable segment 68 is radially translated toward isolator pocket 100. First leg 192 and second leg 196 of retainer 188 are radially spaced apart from one another as they contact first skirt portion 122. Radial translation of removable segment 68 continues until a curved inner surface 238 of side wall portion 98 contacts and optionally biasedly engages outer cylindrical surface 214 of elastomeric body 38. At this time, first leg 192 and second leg 196 have reached an over center position such that the legs at least partially retract toward their original undeflected positions. An inner surface 242 of first leg 192 and an inner surface 246 of second leg 196 engage first skirt portion 122 to retain removable segment 68 at the installed position as depicted in FIGS. 2, 5, and 6.

It should be appreciated that the steps of coupling a damper to elastomeric isolator 32, coupling elastomeric isolator 32 to main body 66, and coupling removable segment 68 to main body 66 may occur before or after main body 66 is fixed to a vehicle. It should also be appreciated that end wall 84 includes a closed exterior surface 250 protecting isolator cavity 100 and elastomeric isolator 32 from possible exposure to contaminants such as water, dirt, sand, or other debris. This arrangement differs greatly from the known prior art that typically includes an open cavity prone to collect contaminants. Isolator pocket 100 is further protected from exposure to undesirable contamination by positioning a surface 254 of sidewall portion 98 adjacent to surface 222 of end wall 84. This interrelationship also restricts relative axial movement between main body 66 and removable segment 68. When removable segment 68 is in the assembled position, a surface 258 of second intermediate wall portion 152 is positioned adjacent to or in biased engagement with surface 226 of elastomeric body 38.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A damper mount, comprising:
an isolator including an elastomeric body surrounding an inner core, the isolator extending along a longitudinal axis; and
a housing including a main body and a removable segment, the main body and the removable segment defining a pocket in receipt of the elastomeric body, wherein the removable segment is radially translatable relative to and restricted from moving along the longitudinal axis, wherein the main body includes a radially inwardly extending slot, the removable segment being removably positioned within the slot.

2. The damper mount of claim 1, wherein the pocket includes a cylindrical surface sized and shaped to correspond to an outer surface of the elastomeric body.

3. The damper mount of claim 2, wherein the main body includes a first portion of the cylindrical surface, and the removable segment includes a second portion of the cylindrical surface.

4. The damper mount of claim 1, wherein the main body includes an end wall extending over the entirety of the elastomeric body.

5. The damper mount of claim 4, wherein the slot does not interrupt the end wall.

6. The damper mount of claim 1, wherein the housing includes an intermediate wall and a radially outwardly extending flange portion, the intermediate wall restricting axial movement of the elastomeric body relative to the housing.

7. The damper mount of claim 6, wherein the main body of the housing includes a first portion of the intermediate wall.

8. The damper mount of claim 7, wherein the removable segment includes a radially inwardly protruding second portion of the intermediate wall.

9. The damper mount of claim 6, wherein the flange portion includes an aperture in receipt of a fastener extending therethrough.

10. A damper mount, comprising:
an isolator including an elastomeric body surrounding an inner core, the isolator extending along a longitudinal axis; and
a housing including a main body and a removable segment, the main body and the removable segment defining a pocket in receipt of the elastomeric body, wherein the removable segment is radially translatable relative to and restricted from moving along the longitudinal axis, the damper mount further comprising a retainer coupling the removable segment to the main body of the housing, wherein the retainer includes a biasedly deformable first arm and an opposed second arm engaging an outer surface of the main body in a snap fit connection.

11. A damper mount, comprising:
an isolator including an elastomeric body and having a longitudinal axis; and
a housing including a main body and a removable segment, the main body including an end wall, wherein each of the main body and the removable segment include portions of a side wall and portions of an intermediate wall, wherein the end wall, the side wall and the intermediate wall define a pocket in receipt of the elastomeric body, wherein the removable segment is radially translatable relative to the longitudinal axis, wherein the main body includes a radially inwardly extending slot, the removable segment being removably positioned within the slot.

12. The damper mount of claim 11, wherein the side wall includes a cylindrical surface sized and shaped to correspond to an outer surface of the elastomeric body.

13. The damper mount of claim 11, wherein the slot does not interrupt the end wall.

14. The damper mount of claim 11, further comprising a retainer coupling the removable segment to the main body of the housing.

15. The damper mount of claim 14, wherein the retainer includes a biasedly deformable first arm and an opposed second arm.

16. The damper mount of claim 11, wherein the removable segment includes a guide maintaining alignment with the main body of the housing.

17. A damper mount, comprising:
an isolator including an elastomeric body surrounding an inner core, the isolator extending along a longitudinal axis; and
a housing including a main body and a removable segment, the main body and the removable segment defining a pocket in receipt of the elastomeric body, wherein the removable segment is radially translatable relative to and restricted from moving along the longitudinal axis, wherein the main body includes a first portion of a surface sized and shaped to correspond to an outer surface of the elastomeric body, and the removable segment includes a second portion of the surface, the first portion of the surface circumferentially extending more than 180 degrees and the second portion of the surface circumferentially extending less than 180 degrees.

18. The damper mount of claim 17, wherein the removable segment includes a first face and an opposite second face defining the circumferential extent of the removable segment, wherein the first face and the second face extend parallel to one another.

19. A damper mount, comprising:
an isolator including an elastomeric body surrounding an inner core, the isolator extending along a longitudinal axis; and
a housing including a main body and a removable segment, the main body and the removable segment defining a pocket in receipt of the elastomeric body, wherein the removable segment is radially translatable relative to and restricted from moving along the longitudinal axis, wherein the main body includes an end wall extending over the entirety of the elastomeric body.

* * * * *